May 22, 1951          O. H. BANKER          2,553,998

POWER TRAIN CONNECTION FOR CHANGE-SPEED TRANSMISSIONS

Filed April 28, 1947          2 Sheets-Sheet 1

INVENTOR.
Oscar H. Banker
BY
Atty

May 22, 1951     O. H. BANKER     2,553,998
POWER TRAIN CONNECTION FOR CHANGE-SPEED TRANSMISSIONS
Filed April 28, 1947     2 Sheets-Sheet 2

INVENTOR.
Oscar H. Banker
BY
Atty

Patented May 22, 1951

2,553,998

UNITED STATES PATENT OFFICE 2,553,998

POWER TRAIN CONNECTION FOR CHANGE-SPEED TRANSMISSIONS

Oscar H. Banker, Evanston, Ill.

Application April 28, 1947, Serial No. 744,275

12 Claims. (Cl. 74—732)

The invention relates to a change-speed transmission. More particularly it pertains to the provision of an improved power train connection comprising a synchronizing means capable of synchronizing the speeds of rotation between driving and driven shafts and constructed and controlled in such manner so as to provide for the disconnection of the shafts. This feature is important in a transmission in cases where it is important to provide an absolute neutral in the transmission so that the vehicle equipped with the transmission may be towed or pushed without the driven shaft causing the engine to turn over.

One particular change-speed transmission in which the present invention provides an improvement comprises a high speed driving shaft connected at its forward end to the vehicle engine, or other source of power, and journaled at its rear end in a driven shaft, which may be in turn connected to the traction wheels of the vehicle. The transmission further includes a tubular low speed driving shaft which surrounds the high speed driving shaft and which is normally driven from the driven element of an hydraulic torque converter of which the driving element is releasably connected with the high speed shaft. The low speed driving shaft of such transmission is capable of being selectively coupled to the driven shaft by means of clutch or gear elements controlled by a shiftable member having "forward," "neutral" and "reverse" positions. The arrangement is therefore such that power is transmitted to the driven shaft in either direction of reduced speed and increased torque through a low speed power train which includes the torque converter and the low speed driving shaft.

A high speed power train includes means for connecting the driven shaft to the high speed driving shaft to accomplish a direct drive while causing the driven shaft to overrun the low speed power train. The means for connecting the high speed driving shaft and the driven shaft includes clutch elements and a synchronizing device in the form of an overrunning clutch so connected between the high speed shaft and the driven shaft that the high speed drive shaft can overrun the driven shaft but so that the speed of the high speed shaft cannot drop below the speed of the driven shaft. Heretofore the synchronizing device has been connected directly between the driven shaft and the high speed driving shaft. The disadvantage of this construction is that the synchronizing device acts to connect the high speed driving shaft and driven shaft in driving relation when the speed of the driven shaft exceeds that of the driving shaft, with the disadvantage that the vehicle cannot be towed or pushed without transmitting power from the driven shaft to the high speed driving shaft and thus to the vehicle engine, even though the shiftable member between the driven shaft and the low speed driving shaft is in its "neutral" position.

It is an important object of the present invention to eliminate the disadvantage set forth above, preferably by an improvement which includes for the synchronizing device a power train connection operable between the high speed driving shaft and the driven shaft only when a driving connection is effected between the low speed drive shaft and the driven shaft.

Other objects include: an arrangement of the synchronizing device in such a manner that it is controlled by the shiftable member that connects or disconnects the driven shaft and the low speed driving shaft; the provision of means for accomplishing the foregoing objects without materially altering the basic structure of the change-speed transmission in which it forms an improvement; the provision of the foregoing improvement without altering the basic operation of such change-speed transmission, particularly that feature of limiting free-wheeling of the vehicle when the transmission has its shiftable member set in the "forward" position.

The foregoing and other important objects and desirable features of the invention will become readily apparent as the following detailed description progresses in connection with the accompanying drawings of two preferred embodiments of the invention. In the drawings.

Figs. 1 and 2

Figure 1:
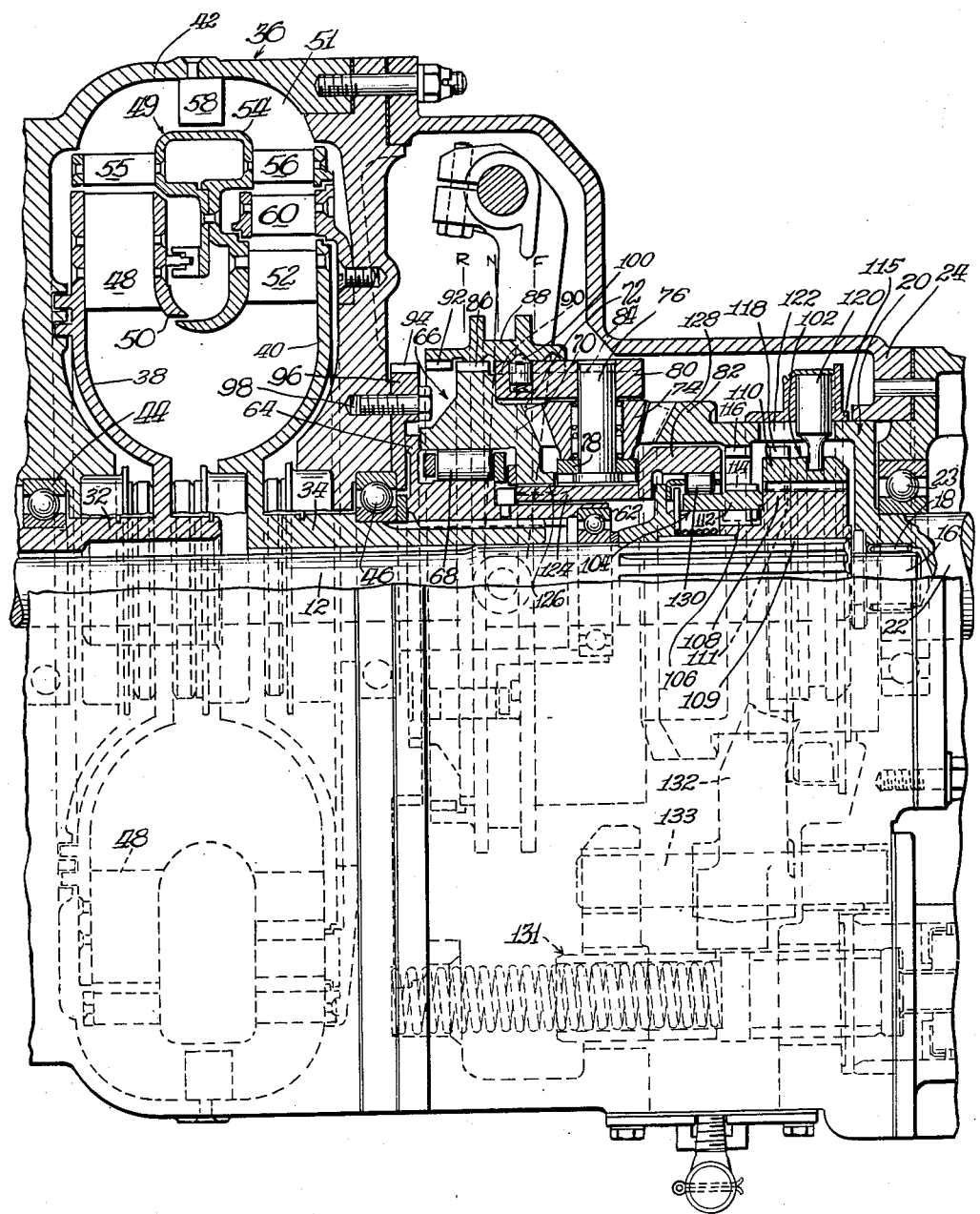
Fig. 1 is a longitudinal sectional view through a change-speed transmission embodying one form of the invention.

In the transmission illustrated in these figures the reference numeral 10 designates the flywheel of an internal combustion engine. The numeral 12 indicates a high speed driving shaft splined at its forward (left) end to the flywheel 10. This driving shaft extends longitudinally of the transmission and its rearmost end is reduced at 16 and provided with an anti-friction bearing 18. The bearing 18 is in turn carried in a driven structure designated generally by the numeral 20. This structure includes a driven shaft 22 which is journalled in a ball bearing unit 23 carried in the rear wall of a gear box or housing 24. The driven shaft 22 is drivingly connected with the vehicle traction wheels or other propelling means.

Figure 2:
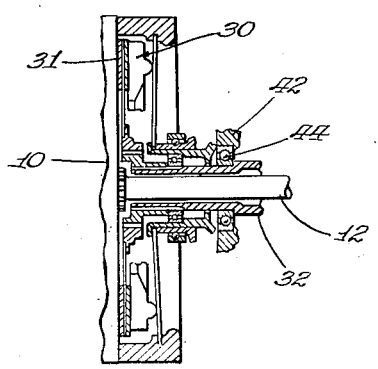
Fig. 2 is a diagrammatic view illustrating driving connections between an engine flywheel and concentric shafts at the left end of Fig. 1.

The flywheel 10 has associated therewith a disconnectible means 30 which may be in the form of a conventional friction clutch, a representation of which is shown in Fig. 2. The clutch plate 31 of this clutch is connected for conjoint rotation with a short tubular shaft 32 which is coaxial with and surrounds the high speed driving shaft 12. The connection between the clutch plate 31 and the tubular shaft 32 may be effected by a spline, as is conventional. The shaft 32 is coaxial with a tubular driving shaft 34, hereinafter referred to as the low speed driving shaft. Each of the shafts 32 and 34 is journalled for rotation with respect to the high speed driving shaft 12.

An hydraulic torque converter 36 of the turbine type is provided for connecting the shafts 32 and 34. This converter is illustrative only, there being several conventional species thereof, wherefore, it will suffice to refer but briefly to the components of this particular converter or turbine. The numeral 38 designates the primary or driving member of the turbine, whereas the secondary or driven member is shown at 40. Another element of the turbine is a casing or housing 42 which encloses the members 38 and 40 and which may further serve to journal the tubular shafts 32 and 34 as at 44 and 46 respectively. The driving or impeller member 38 includes a series of circumferentially spaced blades or vanes 48 connected by a ring 50 comprising a section of an annular core structure 49 within an annular fluid chamber 51. The secondary or impelled member 40 includes a series of circumferentially spaced vanes 52 which support a ring element 54 of the core structure 49. Two series of circumferentially spaced vanes 55 and 56 project oppositely from the ring element 54. Annular sets of vanes 58 and 60 are mounted on the casing 42. The hydraulic means or converter 36 multiplies and transmits torque from the tubular shaft 32 to the low speed drive shaft 34 at reduced speed.

The high speed driving shaft 12 carries an anti-friction bearing 62 on which is journalled a driving member 64. Said member 64 is splined to the rear end portion of the low speed drive shaft 34 and provides part of a driving means or low speed power train between the low speed driving shaft 34 and the driven shaft 22. This low speed power train includes an overrunning clutch 66 comprising a plurality of rollers 68 circumferentially spaced about the driving member 64 and engageable with a second driving member 70. Overrunning clutches of the type herein shown are generally conventional.

In the form of the invention shown here, the driving member 70 is provided integrally with a bevel drive gear 72. The gear 72 is in constant mesh with a plurality of planetary bevel pinions 74, only one of which is shown. Each pinion 74 is journalled on a short radially extending shaft 76, the inner end of which is carried in a mounting ring 78 and the outer end of which is carried in a carrier ring 80.

The pinions 74 are in constant mesh with a driven bevel gear 82 here shown as being formed integrally with the driven structure 20 described above. The bevel gears 72 and 82 and the bevel pinions 74 provide coupling elements that form parts of a disconnectible power train connection between the low speed driving shaft 34 and the driven shaft 22, the connection with the shaft 34 being effected through the overrunning clutch means 66. The outer periphery of the carrier ring 80 is externally splined at 84 to provide a plurality of circumferentially spaced drive or clutch means in the form of teeth alined with a plurality of similar means or teeth 86 formed on the outer periphery of the driving member 70. Shiftable means in the form of a ring 88 encircles the carrier ring 80 and member 70 and is provided for connecting these two parts in driving relation. The ring 88 is internally splined at 90 and is axially slidably mounted on the carrier ring 80 by virtue of the teeth 84. The ring 88 further has internal teeth 92 capable of engagement with either the external teeth 86 on the member 70 or external teeth 94 on a stationary member 96 secured, as at 98, to the stationary housing 42 of the turbine 36, it being understood that the housing 42 is likewise connected to or a part of the housing 24 that encloses the entire transmission. The shiftable ring 88 is further capable of adjustment to a third or "neutral" position in which the teeth 92 thereon engage neither the teeth 86 of the member 70 nor the teeth 94 of the stationary member 96. The ring 88 is shown in the drawings in its "neutral" position. When the ring is shifted to the right so that the teeth 92 engage the teeth 86 of the member 70 the ring is in its "forward" position. When the ring 88 is shifted to the left from its "neutral" position so that the teeth 92 engage the teeth 94 of the stationary member 96, the ring is in its "reverse" position. The carrier ring 80 is provided with a spring-pressed detent 100 engageable with one of three notches in the ring 88, depending upon the position of the ring.

From the description thus far it will be seen that the low speed driving shaft 34 may drive the driven shaft 22 in a low speed forward range or a low speed reverse range, relatively high torque being transmitted through the torque converter 36 as long as the clutch plate 31 and flywheel 10 are connected in driving relation. When the shiftable ring 88 is moved to its "forward" position, the teeth 92 thereon engage the teeth 86 of the member 70 and the teeth 90 thereon remain in mesh with the teeth 84 of the carrier 80. The driving bevel gear 72 is thus locked to the driven bevel gear 82 through the bevel pinions 74 and the driven shaft 22 is rotated in a forward direction through the driven structure 20.

Reverse rotation of the driven shaft 22 is effected through the planetary gear set when the shiftable ring 88 is moved to its "reverse" position so that the teeth 92 thereon engage the teeth 94 on the stationary jaw clutch member 96.

When the transmission is being operated in its low speed forward range, the shaft 12 will be constantly rotating at a speed relatively higher than the speed of rotation of the low speed shaft 34, since the shaft 12 is directly connected to the flywheel 10 and since a speed reduction to the shaft 34 is effected through the torque converter 36. In the usual vehicle equipped with the transmission of the general type herein set forth, the transmission is automatically shifted from low speed to high speed in response to the attainment by the vehicle of a predetermined road speed. At such time the clutch plate 31 is disconnected from the flywheel 10, but the shiftable ring 88 remains in its "forward" position. Prior to disengagement of the clutch plate 31 from the flywheel 10, the speed of rotation of the high speed shaft 12 is considerably greater than the speed of rotation of the driven structure 20. For the driven shaft 22 to be alternatively connected and disconnected in driving relation with the high speed shaft 12, it is necessary that disconnectible driving means be provided therebetween, and to expedite establishment of the connection this disconnectible means includes a synchronizing device. In the present illustration, the disconnectible driving means is designated 102 and the synchronizing device 104, the latter being in the form of an overrunning clutch. The disconnectible driving means has a counterpart in the form of teeth 118 on a ring 110 having internal splines 111 meshed with an externally splined member 108 which is splined to the high speed shaft 12 at 109, whereby said counterpart 110 is constrained for rotation with said shaft. The companion counterpart of the disconnectible driving means is formed by a circular row of jaw clutch teeth 116 on the driven structure 20. An annular drive member 112 of the synchronizing device 104 has a splined connection 106 with an end portion of the annular member 108 and has a circumferential row of clutch teeth 114 meshable with the internal splines or teeth 111 of the member 110 when the clutch 116—118 is engaged. The splined connection 106 has considerable backlash enabling the teeth 114 to move into blocking relation with the ends of the teeth 111 and thereby prevent meshing of the clutch counterparts 116—118 during synchronization of the drive shaft 12 with the driven structure 20 and causing the counterparts 116—118 to be receptively disposed with respect to one another before being slid into mesh. Shifting force is transmitted to the ring 110 through studs 120 projecting radially inwardly through slots 122 in the structure 20 from a ring 115 constrained for rotation with said structure but slidable axially thereon.

In transmissions of the type in which the present invention forms an improvement, the synchronizing device comparable to the synchronizing device 104 here is connected directly between the driven structure 20 and the member 112. The device functions to synchronize the speeds of the driven shaft and the high speed driving shaft; that is to say, the device prevents deceleration of the high speed driving shaft below the speed of rotation of the driven shaft. Although such construction accomplished the desired purpose insofar as concerns synchronizing of the high speed driving shaft and driven shaft, it was subject to the disadvantage that it provided a driving connection between the driven shaft and the high speed driving shaft whenever the speed of rotation of the former exceeded the speed of rotation of the latter, which occurrence would take place when the vehicle was towed or pushed, with the result that the engine was driven through the high speed driving shaft, even though the shiftable means between the low speed driving shaft and the driven shaft was in its "neutral" position. Although such a position may have been desirable from the standpoint of cranking the engine from the vehicle traction wheels, the result was undesirable in cases where the only problem was to tow or push the vehicle as easily as possible.

According to the present invention the foregoing problem is eliminated, and other desirable characteristics of the transmission retained, by means including the synchronizing device, under control of the shiftable means between the driven shaft and the low speed driving shaft so that when such shiftable means (here the shiftable ring 88) is moved to "neutral" there will be no driving connecetion between the driven shaft and the high speed driving shaft. Specifically, this result is achieved in the form of the invention illustrated in Fig. 1 by means disconnecting the synchronizing device 104 from the driven shaft pursuant to placing the transmission in neutral. In the preferred example illustrated, the connection between the synchronizing device 104 and the driven shaft includes a sleeve 124 splined at 126 to an internally splined flange integral with the driving bevel gear 72 and provided at its opposite end with an enlarged generally cup shaped portion 128 connectible with a reduced end portion on the sleeve member 112 by means of a plurality of circumferentially spaced clutch rollers 130. The portion 128, rollers 130 and sleeve member 112 comprise the overrunning clutch forming the synchronizing device 104 previously described.

The operation of the transmission in its low speed range has been previously set forth in connection with the description set forth above. The shift from low to high speed is made automatically in response to predetermined road speed of the vehicle and involves release of the clutch plate 31 from the flywheel 10 and connection of the high speed shaft 12 to the driven structure 20 by means of the clutch 116—118. Apparatus for automatically accomplishing this result may be conventional hydraulic motor means and has been illustrated here only generally in dotted lines at 131 in Fig. 1. A shifter fork 132 slideable on a rod 133 under control of the apparatus 131 shifts the slideable clutch-shifting ring 115.

When the shift from low to high speed is initiated the high speed shaft 12 will be rotating at engine speed which is then greater than that of the driven shaft 22. Concurrently with release of the clutch plate 31 from the flywheel 10, the engine is decelerated and effects a corresponding deceleration of the high speed shaft 12. The synchronizing device 104 prevents deceleration of the speed of the shaft 12 below that of the driven shaft 22, this result being accomplished through the overrunning clutch comprising the members 112 and 128 and rollers 130. Since the member 128 is part of the sleeve member 124, which is in turn connected by the spline 126 to the driving bevel gear 72 and, since the bevel gear 72 is connected to the driven structure 20 by means of the planetary gearing (the shiftable ring 88 being in its "forward" position to connect the member 70 with the carrier ring 80), the driven shaft 22 is effectively connected to the outer element 128 of the synchronizing device. The result, for synchronizing purposes, is the same as that obtainable were the rollers 130 directly between the sleeve member 112 and driven structure 20. When the speeds of the shafts 12 and 22 are synchronized, the shifter ring 110 clutches the driven structure 20 positively to the driving shaft 12 through the teeth 116 and 118, ring 110 and member 108. When the transmission is in its high speed range, the member 70 will still be driven by the driven structure 20 through the planetary gear set, since the shiftable ring 88 is still in its "forward" position; but the low speed shaft 34 will not be driven, inasmuch as the member 70 overruns the member 64.

When it is desired to tow or push the vehicle for the purpose of cranking the engine by means of the traction wheels, the shiftable ring 88 is set in its "forward" position. The transmission will be in low speed range, primarily because the disengagement of the clutch plate 31 from the flywheel 10 and the shifting of the clutch ring 110 into engagement with the driven structure 20 through the teeth 116 and 118, is dependent upon automatic devices operable in response to automatic devices under control of the engine, and these devices will not operate if the engine is not running. The engine will be cranked by the driven shaft 22 by power train connections progressing from the shaft 22, through the driven structure 20 and planetary gear set to the driving member 70 which, although overrunning the member 64, is splined to the sleeve 124 which is in turn connected to the sleeve member 112 by the overrunning clutch means 104. This means as aforesaid is effective when the speed of rotation of the high speed shaft 12 tends to fall below that of the driven shaft 22. In other words, when the shaft 12 is stationary, the driven shaft 22 will pick up the shaft 12 through the overrunning clutch means 104. The foregoing result is achievable only when the shiftable ring 88 is in its "forward" position.

Now, when it is desired to tow or push the vehicle without cranking the engine by means of the driven shaft, the shiftable ring 88 is moved to its "neutral" position. The teeth 92 on the ring 88 will engage neither the teeth 86 on the member 70 nor the teeth 94 on the stationary member 96, and the member 70 will not be connected to the ring. The disconnection of the member 70 from the ring 88 consequently effects a disconnection between the driven structure 20 and the sleeve member 112. Since the high speed shaft 12 is constrained against rotation by the "dead" engine, the connection through the overrunning clutch 104 of the gear 72 with this shaft will prevent rotation of gear 72 whereby the carrier is driven idly by the planetary gear set at one-half the driven shaft speed.

In prior transmissions, wherein the synchronizing device corresponding to the synchronizing device 104 is connected directly between the driven structure 20 and the sleeve member 112, in contrast to being under control of a shiftable control member 88, there could be no absolute "neutral," since such device would continue to effect a power-transmitting connection between the driven shaft 22 and the high speed driving shaft 12 and would thus cause cranking of the engine when the vehicle was pushed.

The synchronizing device 104 limits freewheeling of the transmission while it is connected in the low speed. Upon deceleration of the engine when the transmission is connected in low speed, the high speed shaft 12 will also decelerate, since it is connected directly to the engine, and clutch ring 88 connects the driven structure and the member 70 and the latter is in turn connected to the outer member of the structure of this overrunning clutch is such as to prevent acceleration of the shaft 22 above the speed of rotation of the drive shaft 12.

Figure 3:
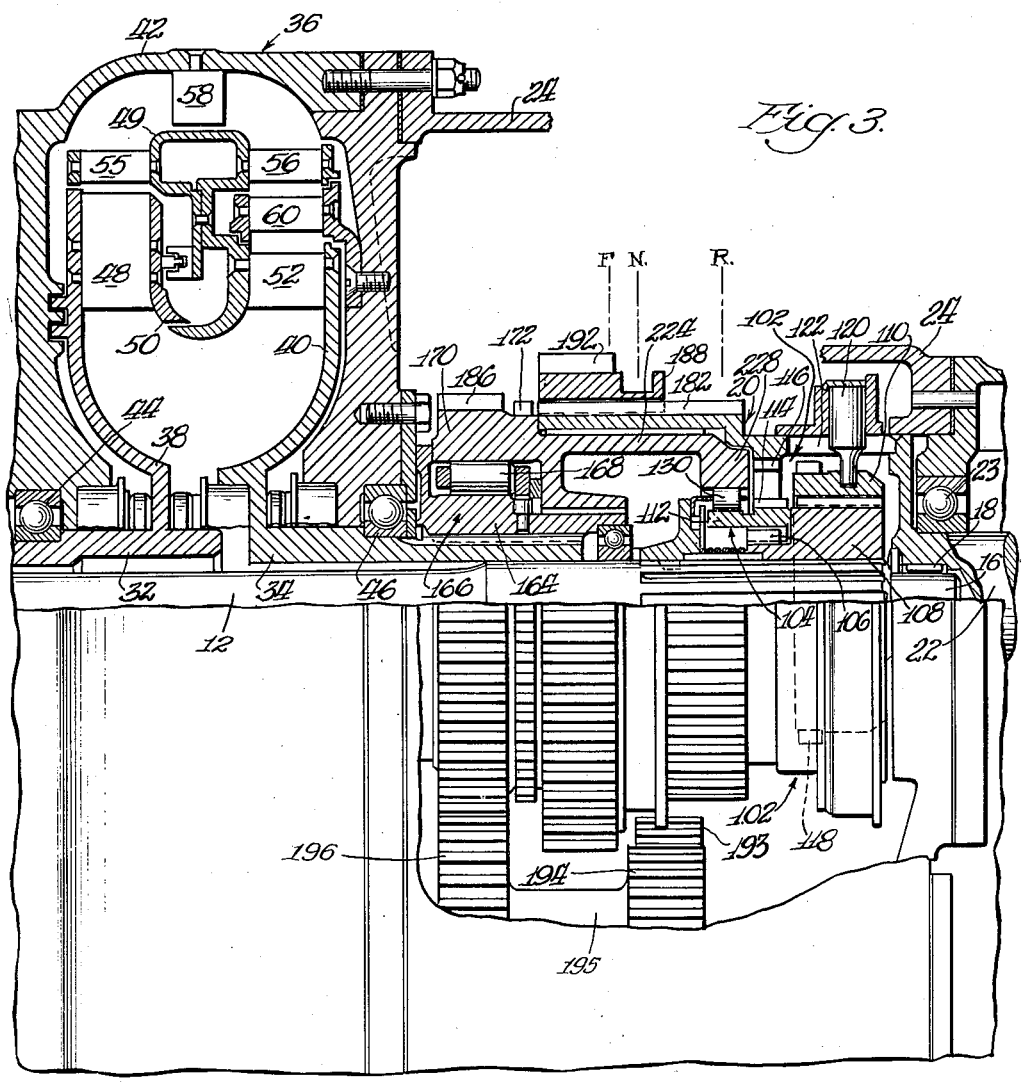
Fig. 3 is a longitudinal sectional view through the transmission and illustrating a second form of the invention incorporated thereinto.

*Fig. 3*

The description of this form of the invention will proceed without the duplication of illustration unnecessary to an understanding thereof, reference being had back to Fig. 2 for the source of power to the high speed and low speed driving shafts. Insofar as the parts of the two forms of the invention are identical, the same reference characters will be used. Insofar as the parts are comparable, the reference characters will be related by the use of numerals of the same value plus 100.

With the foregoing in mind, the reference character 12 designates the high speed driving shaft in Fig. 3 as it did in Fig. 1. Likewise, 34 designates the low speed driving shaft; 20 is the driven structure and 22 is the driven shaft; 102 designates the disconnectible driving means between the high speed shaft 12 and the driven structure 20. The synchronizing device is designated by the numeral 104, as in Fig. 1.

The means for driving the driven shaft 22 from the low speed driving shaft 34 comprises a disconnectible driving means indicated generally by the numeral 166 and includes a first driving member 164, a second driving member 170 and rollers 168, all of which form an overrunning clutch between the low speed shaft 34 and the driven shaft 22. The member 170 is provided as an external gear and jaw clutch cluster having a first set of jaw clutch teeth 172 and a second set of gear teeth 186. The driven structure 20 is provided (in place of the bevel gear 82 of Fig. 1) with clutch element means in the form of a set of external teeth 182 providing part of a disconnectible clutch means, the other part being formed by the teeth 172 on the member 170. The teeth or elements 172 and 182 may be connected by a shiftable clutch ring 188 to establish driving relation between the member 170 and the driven structure 20. The ring 188 is provided further with external teeth 192. When the ring 188 is shifted to the right it is in its "reverse" position, in which position it engages and meshes with external teeth on a gear 193 which is in constant mesh with a gear 194 of a reverse idler cluster 195. The idler 195 includes as an integral part thereof a second gear 196 which is in constant mesh with the gear 186 of the member 170. The external teeth 172 on the member 170, the external teeth 182 on the driven structure 20 and the internal teeth on the shiftable ring 188 are complemental so that when the ring 188 is shifted to the left to its "forward" position the members 170 and 20 will be connected together in driving relation. The "neutral" position of the ring 188 is as shown in Fig. 3 wherein the shiftable ring 188 engages neither the member 170 nor the gear 193.

The member 170 includes an integral sleeve portion 224 which extends axially toward the synchronizing device 104 and which includes an annular portion 228 associated with the rollers 130 of the synchronizing device 104.

The shifting of the shiftable rings 110 and 188 is accomplished by mechanism of the type referred to in connection with the description of Fig. 1.

The operation of the transmission provided with the structure of Fig. 3 is very similar to the operation of the transmission characterized by the form of the invention shown in Fig. 1. When it is desired to operate the transmission in its low speed range, the shiftable ring 188 is shifted to the left to its "forward" position so that the teeth 182 on the driven structure 20 are engaged with the teeth 172 on the member 170 through ring 188. Driving relation between the low speed shaft 34 and the driving member 170 is effected through the overrunning clutch rollers 168.

Upon the attainment of a predetermined road speed, the transmission will be automatically shifted from low to high speed. The ring 188 will remain in its "forward" position. The clutch plate 31 will be disconnected from the flywheel 10 and power to the low speed shaft 34 through the turbine 36 will be cut off. As the speed of rotation of the high speed shaft 12 decelerates in response to deceleration of the engine, it is picked up by the rotating driven shaft 22 through the synchronizing device 104, which is connected to the driven structure 20 through the ring 188. When the speeds of rotation of the high speed shaft 12 and driven shaft 22 are synchronized the two will be positively connected together by functioning of the disconnectible means 102, as in the structure of Fig. 1.

The transmission will be operated in "reverse" speed by shifting of the ring 188 to the right so that the teeth 192 thereon engage the gear 193. Since this gear is in constant mesh with the gear 194 of the reverse idler 195 and since the other gear 196 of the reverse idler is in constant mesh with the teeth 186 on the member 170, reverse rotation will be imparted to the driven structure 20.

*In general*

It will be noted that in both forms of the invention the important characteristic is that the synchronizing device or overrunning clutch 104 is not connected directly between the high speed driving shaft 12 and the driven structure 20, but instead is under control of the disconnectible driving means between the low speed and driven shafts (88 in Fig. 1 and 188 in Fig. 3). The desirable results attributed to this structure in connection with the description of Fig. 1 are characteristic also of the structure of Fig. 3. In both instances the transmission has an absolute "neutral," so that when the shiftable ring 88 of Fig. 1 or 188 of Fig. 3 is in its "neutral" position there will be no power-transmitting connection between the driven shaft 22 and the high speed shaft 12, whereupon the vehicle may be towed or pushed without cranking the engine. Similarly, in either case, the vehicle may be towed or pushed for the purpose of cranking the engine when the shiftable ring 88 of Fig. 1 or 188 of Fig. 3 is shifted to its "forward" position.

It should be understood that the foregoing disclosure relates to only two preferred embodiments of the invention and that the invention has wider application than the specific structures illustrate. It is not desired, therefore, that the invention be limited to the exact details set forth, inasmuch as numerous modifications and alterations may be made therein without departing from the spirit and scope of the invention.

What is claimed is:

1. In a change-speed transmission: concentric relatively high speed and low speed driving shafts; a driven shaft in coaxial relation with said driving shafts; an over-running power train engageable for driving the driven shaft from the low speed shaft including a clutch shiftable between a "forward" adjustment wherein it engages the power train and a "neutral" adjustment wherein said clutch disengages said power train means; an overrunning clutch between the high speed driving shaft and the driven shaft to prevent deceleration of such driving shaft to a speed less than that of the driven shaft incident to deceleration of the driving shafts following a period during which the driven shaft is driven from the low speed driving shaft; high speed clutch means for connecting the high speed driving shaft with the driven shaft when the former decelerates to synchronize with the latter, the connection of the overrunning clutch with the driven shaft being through at least a portion of said shiftable clutch, and said shiftable clutch being operable to terminate such connection pursuant to a shift into "neutral."

2. In a change-speed transmission: concentric relatively high speed and low speed driving shafts; a driven shaft in coaxial relation with said driving shafts; an overrunning power train engageable for driving the driven shaft from the low speed shaft including a clutch shiftable between a "forward" adjustment wherein it engages the power train and a "neutral" adjustment wherein said clutch disengages said power train; an overrunning clutch between the high speed driving shaft and the driven shaft to prevent deceleration of such driving shaft to a speed less than that of the driven shaft incident to deceleration of the driving shafts following a period during which the driven shaft is driven from the low speed driving shaft; high speed clutch means for connecting the high speed driving shaft with the driven shaft when the former decelerates to synchronize with the latter, the connection of the overrunning clutch with the driven shaft being under control of at least a portion of said shiftable clutch, and said shiftable clutch being operable to terminate such connection pursuant to a shift into "neutral."

3. In a change-speed transmission, the combination of: a rotatable high speed driving shaft; a rotatable low speed driving shaft; a rotatable driven shaft; engageable and disengageable driving means between and for driving the driven shaft from the low speed shaft, including a driving element connected to the low speed shaft for rotation therewith and rotatable with respect to the driven shaft when the driving means is disengaged but rotatable with the driven shaft when the driving means is engaged; an overrunning clutch on the high speed shaft; and means operable to connect the overrunning clutch to the driven shaft, including a rotatable member connected to the aforesaid driving element and therefore disconnected from the driven shaft except when the aforesaid driving means is engaged.

4. In a change-speed transmission, the combination of: a fast speed rotatable driving member; a slow speed rotatable driving member; a rotatable driven member; means disconnectible between the driving members for driving the slow member from the fast member at reduced speed; means for driving the driven member from the slow speed driving member when the latter is connected to the first driving member, comprising a clutch; and disconnectible drive means between and for driving the driven member at times from the first driving member, including speed-synchronizing means connected to the driven member through said clutch when it is engaged.

5. In a change-speed transmission, the combination of: a rotatable high speed shaft; a rotatable low speed shaft; a driven shaft; disconnectible driving means between and for connecting the driven shaft to the low speed shaft; means for driving the driven shaft from the high speed shaft including a jaw clutch; and a synchronizing device for said jaw clutch connected between said high speed and driven shafts through said disconnectible driving means.

6. In a change-speed transmission, the combination of: a rotatable high speed driving shaft; a coaxial driven shaft journalled at one end of the high speed shaft; a rotatable low speed driving shaft including a tubular portion surrounding and journalled for rotation with respect to the high speed shaft; first driving means for connecting the low speed and driven shafts in driving relation and including a drive member fast on the low speed shaft tubular portion, a first clutch element, overrunning clutch means between and for connecting the member and clutch element, a second clutch element fast on the driven shaft, and shiftable means for connecting and disconnecting the clutch elements; and second driving means for connecting the high speed and driven shafts in driving relation and comprising disconnectible clutch means between the high speed and driven shafts, and a synchronizing device between the high speed shaft and the aforesaid first clutch element and operable to synchronize the speeds of the high speed and driven shafts only when the aforesaid shiftable means connects the clutch elements.

7. In a change-speed transmission, the combination of: a rotatable high speed driving shaft; a coaxial driven shaft journalled at one end of the high speed shaft; a rotatable low speed driving shaft including a tubular portion surrounding and journalled for rotation with respect to the high speed shaft; first driving means for connecting the low speed and driven shafts in driving relation and comprising a drive member rotatable with the low speed shaft tubular portion and including a first clutch element, a second clutch element rotatable with the driven shaft, and shiftable means for connecting and disconnecting the clutch elements; and second driving means for connecting the high speed and driven shafts in driving relation and comprising disconnectible clutch means between the high speed and driven shafts, and a synchronizing device between the high speed shaft and the aforesaid drive member and operable under control of said shiftable means to synchronize the speeds of the high speed and driven shafts only when the aforesaid shiftable means connects the clutch elements.

8. In a change-speed transmission, the combination of: a rotatable high speed driving shaft; a coaxial driven shaft journalled at one end of the high speed shaft; a rotatable low speed driving shaft journalled for rotation with respect to the high speed shaft; first driving means for connecting the low speed and driven shafts in driving relation and comprising a drive member rotatable with the low speed shaft and including a first clutch element, a second clutch element rotatable with the driven shaft, and shiftable means for connecting and disconnecting the clutch elements; and second driving means for connecting the high speed and driven shafts in driving relation and comprising disconnectible clutch means between the high speed and driven shafts, and a synchronizing device between the high speed shaft and the aforesaid drive member and operable under control of said shiftable means to synchronize the speeds of the high speed and driven shafts only when the aforesaid shiftable means connects the clutch elements.

9. In a change-speed transmission, the combination of: a rotatable high speed driving shaft; a coaxial driven shaft journalled at one end of the high speed shaft; a rotatable low speed driving shaft including a tubular portion surrounding and journalled for rotation with respect to the high speed shaft; first driving means for connecting the low speed and driven shafts in driving relation and including a drive member fast on the low speed shaft tubular portion, a first clutch element, overrunning clutch means between and for connecting the member and clutch element, a second clutch element fast on the driven shaft, and shiftable means for connecting and disconnecting the clutch elements; and second driving means for connecting the high speed and driven shafts in driving relation and comprising a separable clutch device including parts respectively on the driven and high speed shafts, and synchronizing means for synchronizing the speeds of the high speed and driven shafts and having a first member rotatable with the high speed shaft clutch part and a second member rotatable with the aforesaid first clutch element of the first driving means.

10. In a change-speed transmission, the combination of: a rotatable high speed driving shaft; a coaxial driven shaft journalled at one end of the high speed shaft; a rotatable low speed driving shaft including a tubular portion surrounding and journalled for rotation with respect to the high speed shaft; first driving means for connecting the low speed and driven shafts in driving relation and including a drive member fast on the low speed shaft tubular portion, a first clutch element encircling the drive member and having a connecting portion, overrunning clutch means between and for connecting the member and clutch element, a second clutch element rotatable with the driven shaft, and shiftable means for connecting and disconnecting the clutch elements; and second driving means for connecting the high speed and driven shafts in driving relation and comprising a separable clutch device including parts respectively on the high speed and driven shafts, and synchronizing means for synchronizing the speeds of rotation of the high speed and driven shafts, said synchronizing means having a member rotatable with the high speed shaft clutch part and a sleeve encircling the high speed shaft and connected at its opposite ends respectively to the high speed shaft clutch part and the aforesaid connecting portion of the first clutch element, one of said connections being positive and the other including an overrunning clutch.

11. In a change-speed transmission, the combination of: a rotatable high speed driving shaft; a coaxial driven shaft journalled at one end of the high speed shaft; a rotatable low speed driving shaft journalled for rotation with respect to the high speed shaft; first driving means for connecting the low speed and driven shafts in driving relation and comprising a drive member rotatable with the low speed shaft and including a first clutch element, a second clutch element rotatable with the driven shaft, and shiftable means for connecting and disconnecting the clutch elements; and second driving means for connecting the high speed and driven shafts in driving relation and comprising disconnectible clutch means between the high speed and driven shafts, and a synchronizing device between the high speed shaft and the aforesaid drive member and including a sleeve member connected at one end to the high speed shaft and at its other end to the drive member, one of the connections being positive and the other including overrunning clutch means.

12. In a change-speed transmission including a high speed driving shaft, a low speed driving shaft, a driven shaft, an overrunning clutch having a first member connected to the low speed shaft and a second member adapted to be driven by the first member, first disconnectible driving means between the second member and the driven shaft and second disconnectible driving means between the high speed shaft and the driven shaft: that improvement comprising a one-way-drive synchronizing device for synchronizing the speeds of rotation of the high speed shaft and driven shaft prior to connection thereof in driving relation by the second disconnectible driving means, said device including a first member connected to the high speed shaft and a second member connected to the second member of the first overrunning clutch means independently of said first disconnectible driving means.

OSCAR H. BANKER.

REFERENCES CITED

The following references are of record in the file of this patent:

UNITED STATES PATENTS

| Number | Name | Date |
| --- | --- | --- |
| 2,102,634 | Lysholm | Dec. 21, 1937 |
| 2,258,684 | Lysholm | Oct. 14, 1941 |
| 2,322,479 | Schjolin | June 22, 1943 |
| 2,369,126 | Baker | Feb. 13, 1945 |
| 2,369,369 | Peterson | Feb. 13, 1945 |
| 2,397,883 | Peterson | Apr. 2, 1946 |